3,197,491
PROCESS FOR MAKING TETRAETHYL LEAD
Mathias J. Schuler, Pitman, N.J., assignor to E. I. du Pont de Nemours and Company, Wilmington, Del., a corporation of Delaware
No Drawing. Filed Feb. 7, 1961, Ser. No. 87,530
17 Claims. (Cl. 260—437)

This invention relates to the process for making tetraethyl lead and particularly to the use in such process of the combination of an ethylation accelerator and an iodine containing substance which improves the specificity of the ethylation reaction.

Tetraethyl lead is manufactured by the reaction of ethyl chloride with monosodium lead alloy according to the following equation:

$$4EtCl + 4NaPb \rightarrow Et_4Pb + 3Pb + 4NaCl$$

By-products are also normally formed, principally volatile hydrocarbons and high-boiling organoleads, by incomplete ethylation and side reactions. A significant and objectionable by-product is hexaethyl dilead. According to Gittens and Mattison in U.S. Patent 2,763,673, tetraethyl lead for gasoline use should contain less than 0.3% of this impurity, but that sometimes it is produced containing much more, e.g., several percent, depending on process conditions. In general, the shorter the reaction time, also the lower the reaction temperature, the higher the hexaethyl dilead content of the product. When the hexaethyl dilead content is objectionably high, the prior art proposes aftertreatment of the ethylation product. However, use of heat alone or siliceous catalysts as disclosed by McDyer and Closson in U.S. Patent 2,571,987, carbon catalysts as shown by Gittens and Mattison in U.S. Patent 2,763,673, or alkyl iodides and bromides as suggested by Krohn and Shapiro in U.S. Patent 2,555,891, in such aftertreatment tend either to be inefficient as well as time-consuming or to result simultaneously in significant losses of the tetraethyl lead product.

Also, normally found are high-boiling constituents that can be accumulated as distillation residue amounting to as high as 5% of the tetraethyl lead produced and analyzing as high as 90%–95% organolead, calculated as tetraethyl lead. These high-boilers not only represent a significant yield loss but also interfere with the recovery of tetraethyl lead because of their solubilizing effect on the latter. For example, in the steam distillation of the reaction mass to recover the tetraethyl lead, the high-boilers tend to remain behind with the lead sludge, forming a water-immiscible phase which holds tetraethyl lead and thereby reduces its partial pressure and accordingly its volatility with steam.

In U.S. Patent 2,917,527, Baumgartner and Brace disclose a short contact time ethylation process which, because of its unique combination of high (130° C.–160° C.) temperatures with certain reactant and catalyst ratios, produces tetraethyl lead substantially free of hexaethyl dilead. The high operating temperatures entail relatively high heating costs. Further, since tetraethyl lead tends to decompose at the elevated temperatures employed, it appears that to obtain good yields, contact time and temperature must be carefully coordinated. Lower temperatures would favor the appearance of hexaethyl dilead. Too long contact times would produce tetraethyl lead free of hexaethyl dilead, but at substantially reduced yields due to decomposition of the tetraethyl lead. While reaction temperature and contact time can be coordinated and controlled by means of special equipment and attention, the cost of these expedients taken together with the high cost of heating and equipment (high pressure) tend to make such high temperature processes uneconomical.

It would be desirable to be able to effect significant decreases in reaction time or reaction temperature or both without sacrificing yield or quality of the tetraethyl lead product.

It is an object of this invention to improve the specificity of the reaction between ethyl chloride and sodium lead alloy that leads to the formation of tetraethyl lead, at the expense of normally occurring side reactions and undesired products. Another object is to provide a novel process for effecting the reaction of ethyl chloride with sodium lead alloy so as to produce tetraethyl lead having improved quality with respect to contamination by higher boiling organolead by-products. A further object is to provide novel combinations of substances for use in ethylating sodium lead alloy with ethyl chloride, which combination of substances permit the use of relatively low reaction temperatures and relatively short reaction times without sacrifice in the yield or quality of the tetraethyl lead product. A specific object is to so modify the process for making tetraethyl lead as to avoid obtaining hexaethyl dilead in the tetraethyl lead under conditions of contact time and temperature that otherwise result in the appearance of objectional amounts of hexaethyl dilead. Other objects are to advance the art. Still other objects will appear hereinafter.

The above and other objects may be accomplished in accord with this invention which include the process for making tetraethyl lead which comprises reacting ethyl chloride in the liquid phase with monosodium lead alloy at temperatures in the range of 100° C. to about 150° C., employing from about 1 to about 50 moles of ethyl chloride for each mole of alloy, in the presence of from about 0.01 to about 5 parts by weight of an organic ethylation accelerator for each 100 parts of alloy and at least one iodine-containing substance of the group consisting of elemental iodine, metal iodides in which the metals are in groups I to IV of the periodic table, alkyl lead iodides of the formula $R_{4-x}PbI_x$ wherein R represents an alkyl group of 1 to 4 carbon atoms and $x$ is an integer of 1 to 2, and iodine-containing organic compounds which are reactive with NaPb to form sodium iodide in the presence of liquid ethyl chloride at a temperature below 150° C., employing an amount of said iodine-containing substances to provide from about 0.01 to about 10 parts by weight of iodine for each 100 parts of alloy.

It has been found that by carrying out the existing ethylation processes in the presence of the novel combination of an ethylation accelerator and an iodine-containing substance of the specified character, the specificity of the ethylation reaction is improved and the level of high-boiling impurities is materially decreased. The iodine-containing substances function synergistically with the ethylation accelerators to increase the reaction specificity with respect to the formation of tetraethyl lead and to decrease materially the proportions of by-products normally formed in the ethylation reaction. Thereby, tetraethyl lead can be obtained in better yields and better quality than was possible heretofore and usually with less expenditures of energy. Substantial improvements in the yields of tetraethyl lead can be obtained and, at the same time the formation of hexaethyl dilead and other high-boiling impurities is substantially eliminated. Savings in energy are substantial, as reflected by the lower temperatures and shorter reaction times that can be used for ethylations in the presence of the combination of the ethylation accelerators and the iodine-containing substances. The improvement in the quality of the tetraethyl lead product is particularly significant in that it is achieved in situ, i.e. during the course of the ethylation reaction, and therefore the suggested prior art processing to remove hexaethyl dilead from the recovered tetraethyl lead are rendered largely unnecessary. These advantageous results are specific to the combination of the ethylation accelerators with the iodine-containing substances; such results not being obtained by the use of either member without the other and corresponding bromine-containing substances (wherein bromine is substituted for iodine), when employed under the same conditions, are ineffective to produce such advantageous results.

The process and the advantageous results are achieved simply and economically by modifying the existing ethylation processes solely by carrying out such processes in the presence of the novel combination of an ethylation accelerator and an iodine-containing substance of the character hereinbefore defined. The combination of ethylation accelerator and iodine-containing substances is effective over a wide range of operating conditions to reduce the contamination levels of hexaethyl dilead and of the other high-boiling impurities in the tetraethyl lead product. No special equipment or changes are required in the mechanical modes known and commonly employed in the ethylation process. The ethylation accelerator and the iodine-containing substance can be introduced to the conventional reactor separately, together, or with any of the reactants at the beginning and during the reaction.

The reaction temperatures employed in the process of this invention are those normally considered beyond practicality for batch operation, that is, temperatures exceeding 100° C. and preferably ranging from 100° C. to about 130° C. Still higher temperatures to eliminate hexaethyl dilead from the tetraethyl lead product, as used by Baumgartner and Brace in U.S. Patent 2,917,527, are rendered unnecessary by the combination of the iodine-containing substances of this invention with the ethylation accelerators. However, the combination of the ethylation accelerator and the iodine-containing substance at these higher temperatures, up to about 150° C. also improves the specificity of the tetraethylation reaction.

The organic ethylation accelerators employed in this invention are well known substances in tetraethyl lead technology and include the ketones and compositions disclosed in U.S. Patents 2,464,397 and 2,657,225; the aldehydes disclosed in U.S. Patent 2,515,821; the acetals disclosed in U.S. Patent 2,477,465; the esters disclosed in U.S. Patent 2,464,398; the amides disclosed in U.S. Patent 2,464,399; and lower alkanols. A single ethylation accelerator or a mixture of any two or more thereof may be used, as desired. The preferred ethylation accelerators are acetone and ethanol. Normally, the ethylation accelerator, or accelerators, is used in the proportion of from about 0.01 to about 5 parts by weight for each 100 parts of the sodium lead alloy, the optimum proportion depending upon the nature of the particular ethylation accelerator and on other reaction conditions. Preferably, acetone and ethanol are employed in the range from about 0.1 to about 1 part for each 100 parts of the alloy, with the higher proportions being preferred at the higher temperatures.

The iodine-containing substances which may be used in the process of this invention include:

(a) Elemental iodine;

(b) Metal iodides in which the metals are those of groups I to IV of the periodic table, which metal iodides may be represented by the formula $MI_x$ wherein M is the metal and $x$ is an integer corresponding to the valance of M. Representative metal iodides are sodium iodide; lead diiodide and the iodides of Li, K, Mg, Ca, Zn, $Hg^{II}$, B, Al, and $Sn^{IV}$;

(c) Alkyl lead iodides of the formula $R_{4-x}PbI_x$ wherein R represents an alkyl group of 1 to 4 carbon atoms and $x$ is an integer of 1 to 2, and preferably those wherein R is an ethyl group, i.e., triethyl lead iodide and diethyl lead diiodide; and (d) Iodine-containing organic compounds which are reactive with NaPb to form sodium iodide in the presence of liquid ethyl chloride at a temperature below 150° C.; particularly those which are soluble in liquid ethyl chloride, and preferably the iodine-containing saturated organic compounds that consist of 2 to 7 carbon atoms, 1 to 2 iodine atoms and the rest hydrogen atoms.

In a preferred embodiment, a solution of the iodine-containing organic compound in ethyl chloride, which may also contain the ethylation accelerator, is added to the reactor. Representative iodine-containing organic substances are ethyl iodide, ethylene diiodide, propylene diiodide, benzyl iodide, phenyl iodide; quarternary ammonium iodides, such as tetramethylammonium iodide, tetrabutylammonium iodide, stearyl trimethylammonium iodide; and "positive-iodine" compounds such as iodoacetone, N-iodosuccinimide, and triiodonitromethane, which, in analogy to iodine itself, produce iodides by oxidation-reduction reactions.

Mixtures of 2 or more of such iodine-containing substances may be employed, preferably mixtures of ethyl iodide and ethyl lead iodides, particularly the equimolar mixture of ethyl iodide and triethyl lead iodide which is obtained by treating tetraethyl lead with iodine.

Broadly, the iodine-containing substances are used in amounts providing from about 0.01 to about 10 parts of iodine (I) for each 100 parts of the sodium lead alloy. The iodine-containing substances should be present during the ethylation, added at least during the first half, and preferably are present when the reaction is initiated. It should be understood that the iodine-containing substances vary in their effectiveness for the present purpose. The particularly preferred ethyl chloride-soluble iodine-containing substances, i.e., the organic iodides, such as ethyl iodide, and the alkyl lead iodides, such as triethyl lead iodide, are the most effective and provide optimum results in low concentrations, for example from about 0.05 to about 1 part by weight of iodine for each 100 parts of alloy. It is also preferred to use from about 0.2 to about 2 parts by weight of iodine for each part of the preferred ethylation accelerator, e.g., acetone or ethanol, and to use the higher concentrations of ethylation accelerator and iodine-containing compounds at the higher temperatures and shorter reaction times. Elemental iodine ($I_2$), in excess of about 1 part for each 100 parts of alloy, tends to retard the ethylation reaction. However, with a lower alkanol as the ethylation accelerator, this effect can be overcome and there may be used up to about 10 parts by weight of iodine per 100 parts of alloy, preferably from about 0.5 part to about 6 parts of iodine. The use of a combination of iodine and ethanol thus comprises another preferred embodiment of the invention. Also, when ethanol is used as the ethylation accelerator, the other iodine-containing substances are preferably employed in a proportion from about 0.05 to about 6 parts for each 100 parts of alloy.

As in existing processes, the quantity of the ethyl chloride may be varied greatly, from about 1 up to about 50 molar proportions. Preferably, 2 to 15 moles of ethyl chloride per mole of alloy are used over the 110° C.–130° C. temperature range. The excess ethyl chloride is of course recovered for reuse, as disclosed in the art, e.g., by distillation, and as such may contain small proportions of tetraethyl lead. A feature of the present invention is to utilize such recycle ethyl chloride containing tetraethyl lead, and, by the addition of iodine thereto, prepare in situ ethyl iodide and triethyl lead iodide. If the tetraethyl lead in the ethyl chloride is insufficient to provide the desired quantity of the iodine-containing compounds, additional (make-up) quantities of other iodine-containing substances can be added to this ethyl chloride feed stream.

It should be noted that the ethylation reaction normally produces two classes of ethylated lead products, those titratable with iodine and those (comprising a minor group) not titratable with iodine. In the first group, are the completely organic lead compounds including the tetraalkyl leads and the hexaalkyl dilead classes of organoleads which react as follows:

and
$$R_4Pb + I_2 \rightarrow RI + R_3PbI$$
$$R_3Pb-PbR_3 + I_2 \rightarrow 2R_3PbI$$

Incompletely ethylated lead, such as triethyl lead chloride and diethyl lead dichloride, are not iodine-titratable under the analytical conditions used. Neither are they particularly volatile with steam. However, like the completely organo-leads, they are soluble in hydrocarbons, and thus, by solvent extraction of the reaction mass, can be determined as part of the total organo-lead product. The yields reported herein are iodine-titratable yields. Accordingly, when, by the method of this invention, hexaethyl dilead (Hexa) and other high-boiling iodine-titratable leads (HB) are substantially absent, these values reflect both yield and purity of the tetraethyl lead. In practice, when the ethylation step is completed, the tetraethyl lead is usually recovered by steam distillation of the reaction mass. Under such conditions, part of the hexaethyl dilead content is destroyed while the water-soluble compounds (incompletely ethylated lead compounds such as triethyl lead halide) and some of the high-boiling constituents are left behind in the still pot; thus the product is somewhat purified. Nevertheless, tetraethyl lead, made in accordance with the present invention, is significantly lower in hexaethyl dilead, high-boilers, and water-soluble organo-leads than the product obtained in the same fashion but in the absence of the iodine-containing substances. Also, tetraethyl lead, recovered by solvent extraction (using hexane, benzene, toluene, liquid ethyl chloride and the like, to dissolve and separate the soluble organic lead compounds, followed by filtration and evaporation of the solvent), shows significantly lower levels of all impurities. The ratio of the iodine titratable yield to the conversion of the alloy (i.e., percent consumed), expressed in the examples as Y/C, illustrates the unexpected result that the iodine-containing substances of the invention effect more efficient use of the reactants to produce tetraethyl lead (at the expense of side reactions and products), that is, increase the specificity of the tetraethylation reaction.

In order to more clearly illustrate this invention, preferred modes of carrying it into effect, and the advantageous results to be obtained thereby, the following examples are given in which the parts and proportions are by weight except where specifically indicated otherwise, "Hexa" means hexaethyl dilead, and "HB" means other high-boiling constituents.

*Example 1*

60 parts of liquid ethyl chloride, containing (a) 0.06 part acetone and (b) 0.1 part of I as an equimolar mixture of ethyl iodide and triethyl lead iodide, was added to 100 parts of monosodium lead alloy in a nitrogen-flushed bomb which was then closed and the contents thereof agitated while being heated externally with 96° C.–98° C. water for 30 minutes during which time the inside temperature soon rose to a maximum of 125° C., then dropped and levelled off at about 100° C. After the heating period, the bomb was cooled, opened, and the contents steam distilled to recover the ethylated product. Analysis of the reaction products gave the following results which are compared with those from an otherwise identical control (no iodide) experiment:

|  | Control (No Iodide) | Iodide |
| --- | --- | --- |
| Yield, percent | 88.2 | 90.5 |
| Y/C | .910 | .922 |
| Hexa, percent | nil | nil |
| HB, percent | 2.57 | 1.14 |
| Na to hydrocarbon, percent | 6.57 | [1] 5.44 |

[1] 22% reduction.

That iodide improves the specificity of the tetraethylation reaction is shown in this example by the improved yield and quality of the ethylation product, as well as by the reduced conversion of sodium of the alloy to produce volatile hydrocarbons via the Wurtz reaction. The low "Hexa" content of the control is the result of the relatively long reaction time at the elevated temperatures.

*Example 2*

An ethylation autoclave was charged with 100 parts monosodium lead alloy, 1.5 parts $PbI_2$ (0.83 part I), and 120 parts liquid ethyl chloride containing 0.1% by weight acetone. By heating externally with 100° C. water, the reaction mixture, under agitation, reached a maximum temperature of about 115° C. in one minute, then dropped and levelled off at about 100° C. within a few minutes. After a total heating time of one hour, the reactor was cooled, opened, and its contents thoroughly extracted with liquid ethyl chloride at 0° C. and filtered. The crude tetraethyl lead yield was 92.6%, and contained only 0.48% residue (i.e., material boiling above 50° C. at 0.2 mm. Hg). The control run gave a lower yield (87.6%) with a higher percentage (2.6%) of high-boiling residue.

Good results were also obtained with ethyl iodide (in the ethyl chloride) and with fixtures of ethyl iodide and $PbI_2$, at the same I concentration under these conditions.

*Example 3*

Example 2 was repeated with (a) 0.3% by weight of ethyl alcohol in place of the 0.1% acetone in the ethyl chloride and (b) 3 parts of $PbI_2$. The yield was 88% with 1.7% high boilers, compared to 85% with 4.0% high boilers for the control.

*Example 4*

The procedure of Example 2 was followed with (a) 0.3% by weight of ethyl alcohol in place of the acetone and (b) elemental iodine ($I_2$) in the quantities tabulated below per 100 parts of the alloy. The results follow.

|  | Yield, percent | Hexa, percent | HB, percent |
| --- | --- | --- | --- |
| Control | 73.0 | 0.39 | 4.9 |
| 6.0 parts $I_2$ | 75.6 | nil | 0.62 |

The low yields in this set of experiments are attributed to loss of tetraethyl lead during evaporation of the ethyl chloride extracts. The relative order of results indicates, however, that use of the iodine and ethanol combination can provide substantially improved quality tetraethyl lead with significant yield improvement.

*Example 5*

Following the procedure described by Baumgartner and Brace in U.S. Patent 2,917,527 for effecting short contact time high temperature ethylations, 3 gram portions of ethyl chloride (EtCl) containing 0.38% by weight of acetone and with and without ethyl iodide (EtI) as given below were heated in a bath at 120° C. with 2 gram portions of 10 on 20 mesh monosodium lead alloy for 10, 5, 3, and 1.5 minutes. Typical results are tabulated below:

120° C. ETHYLATIONS
[A—10 Minutes]

| Wt. Percent EtI in EtCl | g. I/100 g. NaPb | Yield, Percent | Hexa, Percent | Y/C |
|---|---|---|---|---|
| — | — | 89.3 | 0.2 | .905 |
| 0.17 | 0.21 | 91.5 | nil | .928 |

[B—5 Minutes]

| | | 86.4 | 0.9 | .899 |
|---|---|---|---|---|
| 0.017 | 0.02 | 86.1 | 0.2 | .903 |
| 0.043 | 0.05 | 87.1 | nil | .902 |
| 0.085 | 0.10 | 88.8 | nil | .913 |
| 0.17 | 0.21 | 89.0 | nil | .926 |
| 0.34 | 0.42 | 89.0 | nil | .923 |
| No acetone, No iodide | | 22.5 | 3.4 | .775 |
| No acetone+0.17 Wt. Percent EtI | | 69.4 | 1.2 | .896 |

[C—3 Minutes]

| — | — | 82.3 | 2.5 | .895 |
|---|---|---|---|---|
| 0.085 | 0.10 | 86.0 | nil | .909 |
| 0.17 | 0.21 | 84.5 | nil | .920 |
| 0.34 | 0.42 | 83.5 | nil | .915 |
| No acetone, No iodide | | 19.4 | 3.6 | .765 |
| No acetone+0.17 Wt. Percent EtI | | 54.0 | 2.0 | .871 |

[D—1.5 Minutes]

| — | — | 81.5 | 3.4 | .888 |
|---|---|---|---|---|
| 0.17 | 0.21 | 82.4 | nil | .915 |

Substantially identical results were obtained in the above series of runs on replacing ethyl iodide by an equimolar mixture of ethyl iodide and triethyl lead iodide providing the same concentration of I based on the alloy.

The results show that both the ethylation accelerator and the iodide are necessary and that, by the use of the iodide, tetraethyl lead can be produced substantially free of hexaethyl dilead under conditions that normally yield rather large amounts of this by-product. Under each set of conditions, the yields are significantly better in the presence than in the absence of iodide; since hexaethyl dilead when present contributes to the yield, the results for the iodide runs have the added significance of representing yields of better quality product.

Further, comparison of the 10 minute control with the 5 minute iodide runs shows that the present invention permits a material shortening of the reaction time, substantially without sacrificing yield or quality of the product. The iodides also are effective to eliminate hexaethyl dilead at short contact times where acetone alone is impractical at the 120° C. temperature level.

*Example 6.—Elimination or reduction of high boilers at 120° C. by iodides*

Reaction time: 10 minutes at 120° C.

The procedure of A of Example 5 was repeated. The reaction masses from five separate Parr bomb runs (in the presence of acetone with and without $C_2H_5I$ catalyst) were combined and extracted with n-hexane. Reaction time was 10 minutes so that the product resulting from each catalyst system would be "hexa"-free. After removal of the solvent, the IR spectra of both products were obtained using a 0.117 mm. cell. The spectrum of the product, prepared with acetone alone, contained the characteristic "high-boiler" absorption at 9.5 microns; while the spectrum of the product, prepared with aceton+$C_2H_5I$, did not.

Comparison with the spectrum of the 9.5 micron impurity indicated that the iodide reduced the concentration of such high-boiling impurity from approximately 2% to less than 0.5%, the lower detection limit with the cell used.

*Example 7*

The procedure of Example 5 was repeated at a heating bath temperature of 130° C. for 3, 5, and 10 minutes, under which conditions the Wurtz reaction is the prime competitor.

| Reaction time, minutes | $C_2H_5I$ Wt. percent on $C_2H_5Cl$ | Y/C |
|---|---|---|
| 3 | none | .898 |
| 3 | 0.17 | .925 |
| 5 | none | .899 |
| 5 | 0.17 | .924 |
| 10 | none | .884 |
| 10 | 0.17 | .924 |

The above results again show that use of the iodide increases the efficiency of the reaction to produce tetraethyl lead at the expense of side reactions.

*Example 8*

In the method of Example 5, a mixture of 2 grams of 10 on 20 mesh NaPb alloy, 4.5 grams ethyl chloride containing 0.38 wt. percent acetone, and 0.0083 gram mercuric iodide was heated in a 120° C. oil bath for 15 minutes. The yield of tetraethyl lead was 89.5%, and yield/conversion was 0.91. The control (without iodide) yield is about 88%, with yield/conversion of 0.90.

*Example 9*

Example 8 was repeated with 2 grams alloy, 5 grams ethyl chloride containing 0.38% acetone, and 0.005 gram aluminum iodide. The yield of tetraethyl lead was 91%, and yield/conversion was 0.92.

*Example 10*

Example 8 was repeated with 2 grams alloy, 3.1 grams ethyl chloride containing 0.38% acetone, and 0.011 gram tetra(n-propyl) ammonium iodide, to give a 92.5% yield of tetraethyl lead with a yield/conversion of 0.927.

*Example 11*

A jacketed stainless steel pressure reactor was charged at room temperature under nitrogen with 100 parts of 10 on 20 mesh NaPb, 145 parts ethyl chloride containing 0.38 wt. percent acetone, and 0.94 part NaI. (The ethyl chloride loading density corresponded to 0.5 gram/cc. of reactor capacity.) The reactor was sealed and while being vigorously agitated (rocked), 120° C. heating oil was circulated through its jacket for 30 minutes. Within a minute after the start of heating, the internal temperature rose to 140° C., then decreased with time. The yield of tetraethyl lead was 82% compared to 64% without iodide.

*Example 12*

Example 11 was repeated except that the iodide was stannic iodide. The yield of tetraethyl lead was 90%.

As a further check on the quality of the tetraethyl lead product, toluene solutions of the tetraethyl lead product (30 g./liter) were stored in the light and in the dark. Products, made in the absence of iodide, gave amber solutions (the higher the "Hexa" content the more intense the color) which precipitated an orange sludge within minutes of exposure to sunlight and within a few days on storage in the dark. In contrast, the "nil-Hexa" products, obtained with the aid of the iodide, gave colorless solutions which were stable for up to 2 weeks in sunlight and for more than 4 months in the dark. Further, gasoline, containing "nil-Hexa" tetraethyl lead of the invention, shows greatly improved oxidative stability (i.e., lengthened induction periods) versus the appropriate control.

It should be noted that the temperature of the reaction mass is at least 100° C. in the above examples. When a heating bath is employed, the reaction mass temperature exceeds the bath temperature for a good part of the time, as expected for the exothermic process. For instance, in Example 1, the maximum temperature developed was about 125° C., while the heating means was only 98° C.; in Examples 11–12 above it was 140° C. inside while only 120° C. outside. Temperatures of up to 150° C. have been developed in these reactions with good results; that is, yield with iodide was better than without. This overlaps the Baumgartner and Brace (U.S. Patent 2,917,527) 130° C.–160° C. range, and shows improvement thereover. Example 7 indicates that the iodide is especially effective with increasing reaction time: yield/conversion is high and holding steady for the iodide runs while, for the iodide-less runs, it is lower to begin with and dropping. Practically speaking, with iodide, control of the time-temperature relationship is less critical at these high temperatures, which makes for an easier operation. In Example 7, the internal temperature was not measured, but from previous work and the results of the other examples, the internal temperature was undoubtedly substantially above 130° C.

Also, as shown by the above examples, iodine (free or combined) is ineffective alone, i.e., in the absence of the ethylation accelerator, to produce tetraethyl lead substantially free of hexaethyl dilead and other undesired by-products, under conditions which normally produce such impurities.

It should be noted that the yield improvement shown in the examples cannot be attributed to the so-called "B" reaction, represented by the equation,

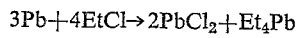

$$3Pb + 4EtCl \rightarrow 2PbCl_2 + Et_4Pb$$

which reaction requires lengthy reaction times of the order of 5 hours at 120° C. Analysis of the reaction masses obtained with the aid of the iodine-containing substances of this invention, particularly for $PbCl_2$, showed that the amount of tetraethyl lead formed by way of the "B" reaction was substantially nil (less than 0.1%) at all temperatures at the contact times employed.

It will be understood that the preceding examples have been given for illustrative purposes solely and that this invention is not limited to the specific embodiments described therein. On the other hand, it will be understood that, subject to the limitations set forth in the general description, many variations can be made in the ethylation accelerators, in the iodine-containing substances, in the proportions of both the ethylation accelerators and the iodine-containing substances, and in the conditions of operation, without departing from the spirit and scope of this invention.

From the preceding disclosure, it will be apparent that this invention provides an improved process for making tetraethyl lead whereby the specificity of the desired reaction is increased at the expense of undesired reactions and undesired by-products, and provides tetraethyl lead of improved quality and usually in increased yields with less energy and in shorter reaction times. These advantages are obtained economically with a simple modification of the existing processes for making tetraethyl lead without change in the equipment or mechanical modes of operation. Accordingly, it will be apparent that this invention constitutes a valuable advance in and contribution to the art.

The embodiments of the invention in which an exclusive property or privilege is claimed are defined as follows:

1. The process for making tetraethyl lead which comprises reacting ethyl chloride in the liquid phase with monosodium lead alloy at temperatures in the range of 100° C. to about 150° C., employing from about 2 to about 50 moles of ethyl chloride for each mole of alloy, in the presence of from about 0.01 to about 5 parts by weight of acetone for each 100 parts of alloy and at least one iodine-containing substance of the group consisting of elemental iodine, metal iodides in which the metals are in groups I to IV of the periodic table, alkyl lead iodides of the formula $R_{4-x}PbI_x$ wherein R represents an alkyl group of 1 to 4 carbon atoms and $x$ is an integer of 1 to 2, iodine-containing saturated organic compounds that consist of 2 to 7 carbon atoms, 1 to 2 iodine atoms and the rest hydrogen atoms, tetraalkylammonium iodides, and iodoacetone, employing an amount of said iodine-containing substances to provide from about 0.01 to about 1 part by weight of iodine for each 100 parts of alloy.

2. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of acetone for each 100 parts of alloy and at least one iodine-containing substance of the group consisting of elemental iodine, metal iodides in which the metals are in groups I to IV of the periodic table, alkyl lead iodides of the formula $R_{4-x}PbI_x$ wherein R represents an alkyl group of 1 to 4 carbon atoms and $x$ is an integer of 1 to 2, iodine-containing saturated organic compounds that consist of 2 to 7 carbon atoms, 1 to 2 iodine atoms and the rest hydrogen atoms, tetraalkylammonium iodides, and iodoacetone, employing an amount of said iodine-containing substances to provide from about 0.05 to about 1 part by weight of iodine for each 100 parts of alloy.

3. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of acetone for each 100 parts of alloy and at least one iodine-containing saturated organic compound that consists of 2 to 7 carbon atoms, 1 to 2 iodine atoms and the rest hydrogen atoms, employing an amount of said iodine-containing compounds to provide from about 0.05 to about 1 part by weight of iodine for each 100 parts of alloy.

4. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of acetone for each 100 parts of alloy and ethyl iodide in an amount to provide from about 0.01 to about 1 part by weight of iodine for each 100 parts of alloy.

5. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of acetone for each 100 parts of alloy and at least one alkyl lead iodide of the formula $R_{4-x}PbI_x$ wherein R represents an alkyl group of 1 to 4 carbon atoms and $x$ is an integer of 1 to 2, employing an amount of said alkyl lead iodide to provide from about 0.05 to about 1 part by weight of iodine for each 100 parts of alloy.

6. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of acetone for each 100 parts of alloy and at least one alkyl lead iodide of the formula $R_{4-x}PbI_x$ wherein R represents an ethyl group and $x$ is an integer of 1 to 2, employing an amount of said alkyl lead iodide to provide from about 0.05 to about 1 part by weight of iodine for each 100 parts of alloy.

7. The process for making tetraethyl lead which comprises reacting ethyl chloride in the liquid phase with monosodium lead alloy at temperatures in the range of 100° C. to about about 15 moles of ethyl chloride for each mole of alloy, in the presence of from about 0.1 to about 1 part by weight of acetone for each 100 parts of alloy and an equimolar mixture of ethyl iodide and triethyl lead idoide, employing an amount of said mixture to provide from about 0.05 to about 1 part by weight of iodine for each 100 parts of alloy.

8. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of acetone for each 100 parts of alloy and at least one metal iodide in which the metal is in groups I to IV of the periodic table, employing an amount of said metal iodide to provide from about 0.05 to about 1 part by weight of iodine for each 100 parts of alloy.

9. The process for making tetraethyl lead which comprises reacting ethyl chloride in the liquid phase with monosodium lead alloy at temperatures in the range of 100° C. to about 150° C., employing from about 1 to about 50 moles of ethyl chloride for each mole of alloy, in the presence of from about 0.01 to about 5 parts by weight of a lower alkanol for each 100 parts of alloy and at least one iodine-containing substance of the group consisting of elemental iodine, metal iodides in which the metals are in groups I to IV of the periodic table, alkyl lead iodides of the formula $R_{4-x}PbI_x$ wherein R represents an alkyl group of 1 to 4 carbon atoms and $x$ is an integer of 1 to 2, iodine-containing saturated organic compounds that consist of 2 to 7 carbon atoms, 1 to 2 iodine atoms and the rest hydrogen atoms, tetraalkylammonium iodides, and iodoacetone, employing an amount of said iodine-containing substances to provide from about 0.01 to about 10 parts by weight of iodine for each 100 parts of alloy.

10. The process for making tetraethyl lead which comprises reacting ethyl chloride in the liquid phase with monosodium lead alloy at temperatures in the range of 100° C. to about 150° C., employing from about 2 to about 50 moles of ethyl chloride for each mole of alloy, in the presence of from about 0.01 to about 5 parts by weight of ethanol for each 100 parts of alloy and at least one iodine-containing substance of the group consisting of elemental iodine, metal iodides in which the metals are in groups I to IV of the periodic table, alkyl lead iodides of the formula $R_{4-x}PbI_x$ wherein R represents an alkyl group of 1 to 4 carbon atoms and $x$ is an integer of 1 to 2, iodine-containing saturated organic compounds that consist of 2 to 7 carbon atoms, 1 to 2 iodine atoms and the rest hydrogen atoms, tetraalkylammonium iodides, and iodoacetone, employing an amount of said iodine-containing substances to provide from about 0.01 to about 10 parts by weight of iodine for each 100 parts of alloy.

11. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of ethanol for each 100 parts of alloy and at least one iodine-containing saturated organic compound that consists of 2 to 7 carbon atoms, 1 to 2 iodine atoms and the rest hydrogen atoms, employing an amount of said iodine-containing compounds to provide from about 0.05 to about 6 parts by weight of iodine for each 100 parts of alloy.

12. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of ethanol for each 100 parts of alloy and ethyl iodide in an amount to provide from about 0.05 to about 6 parts by weight of iodine for each 100 parts of alloy.

13. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of ethanol for each 100 parts of alloy and at least one alkyl lead iodide of the formula $R_{4-x}PbI_x$ wherein R represents an alkyl group of 1 to 4 carbon atoms and $x$ is an integer of 1 to 2, employing an amount of said alkyl lead iodide to provide from about 0.05 to about 6 parts by weight of iodine for each 100 parts of alloy.

14. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of ethanol for each 100 parts of alloy and an equimolar mixture of ethyl iodide and triethyl lead iodide, employing an amount of said mixture to provide from about 0.05 to about 6 parts by weight of iodine for each 100 parts of alloy.

15. The process of making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of ethanol for each 100 parts of alloy and at least one metal iodide in which the metal is in groups I to IV of the periodic table, employing an amount of said metal iodide to provide from about 0.05 to about 6 parts by weight of iodine for each 100 parts of alloy.

16. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of ethanol for each 100 parts of alloy and lead diiodide in an amount to provide from about 0.1 to about 6 parts by weight of iodine for each 100 parts of alloy.

17. The process for making tetraethyl lead which comprises reacting ethyl chloride in the liquid phase with monosodium lead alloy at temperatures in the range of 100° C. to about 150° C., employing from about 2 to about 15 moles of ethyl chloride for each mole of alloy, in the presence of from about 0.1 to about 1 part by weight of ethanol for each 100 parts of alloy and from about 0.5 to about 6 parts by weight of elemental iodine for each 100 parts of alloy.

References Cited by the Examiner

UNITED STATES PATENTS

| | | | |
|---|---|---|---|
| 1,611,695 | 12/26 | Sullivan et al. | 260—437 |
| 1,622,228 | 3/27 | Midgely et al. | 260—437 |
| 1,705,723 | 3/29 | Daudt | 260—437 |
| 2,464,397 | 3/49 | Holbrook | 260—437 |
| 2,848,471 | 8/58 | Pagliarini | 260—437 |

TOBIAS E. LEVOW, *Primary Examiner.*

ABRAHAM H. WINKELSTEIN, *Examiner.*